3,705,010
RECOVERY OF BROMINE FROM ORGANIC BROMIDES

Ralph A. Davis, Midland, and Ronald G. Tigner, Coleman, Mich., assignors to The Dow Chemical Company, Midland, Mich.
No Drawing. Filed Dec. 7, 1970, Ser. No. 95,881
Int. Cl. C01b 7/10, 7/12
U.S. Cl. 423—502
8 Claims

ABSTRACT OF THE DISCLOSURE

Disclosed in a process for the recovery of bromine values as $Br_2$ from organic bromides. The process involves reacting the organic bromide with oxygen at an elevated temperature in the presence of a catalyst. The catalyst is selected from one or more of the oxides of chromium, vanadium, tungsten, molybdenum, cerium, uranium or aluminum.

BACKGROUND OF THE INVENTION

Certain parts of the world in which there is a shortage of bromine find it necessary to import this useful halogen, either in the elemental form or as HBr. Bromine poor areas which import $Br_2$ or HBr, find that such importation is complicated by the fact that these compounds are highly corrosive and consequently require special storage vessels for shipment.

Organic bromides, such as ethylene dibromide (EDB), are non-corrosive, and can be transported as any other liquid such as by pipeline or in the hole of a tanker. In order for the transportation of organic bromides as bromine sources to be economical, a convenient method for recovery of the bromine values in a useful form is necessary. Regardless of the problems encountered in transporting bromine and HBr, an improved method of recovering bromine values from excess organic bromides would be desirable.

Ethylene dibromide can be thermally cracked to provide vinyl bromide and HBr; however, even at 100% conversions, only one molecule of HBr is produced per molecule of EDB. Little, if any, elemental bromine is produced by this process. The ordinary burning of organic bromides is not a satisfactory method of recovering bromine, since the combustion is usually incomplete leaving partially decomposed bromides in the vent gases. If oxygen is used in an ordinary burner, the result is frequently a violent explosion.

The above described difficulties which are encountered in the recovery of bromine from EDB and other organic bromides can be avoided by the use of stable oxidation catalysts. Those nickel containing oxidation catalysts known to be useful are undesirable since they form volatile bromides which are rapidly lost at the temperatures required for reaction.

It is an object of the present invention to provide a process for the recovery of bromine as $Br_2$ from organic bromides.

An additional object is to provide such a process which employs a stable oxidation catalyst and thus permits the use of oxygen at high temperatures as oxidizing agent.

A further object is to provide such a process which employs catalysts which do not form volatile bromides.

SUMMARY OF THE INVENTION

The invention is a catalytic process for the recovery of bromine values from organic bromides. The process involves reacting the organic bromide with oxygen at a temperature within the range of from 200° to 1200° C. in the presence of a catalyst. The catalyst is selected from one or more of the oxides of chromium, vanadium, tungsten, molybdenum, cerium, uranium or aluminum.

DESCRIPTION OF PREFERRED EMBODIMENTS

The oxidation state of the metal oxide catalyst is not critical. Any of the known oxides of the metals set out above may be used. Examples of such oxides are $Cr_2O_3$, $Al_2O_3$, $V_2O_3$, $V_2O_5$, $Mo_3O_8$, $Mo_2O_5$, $MoO_2$, $WO_2$, $W_2O_5$, $CeO_2$ and $U_3O_8$.

The catalyst is normally a combination of two or more metal oxides. As is the case with the use of metal oxides as cracking catalysts, the major component supports the minor component upon which it has been placed by impregnation. Commercially available metal oxide cracking catalysts may be used in the practice of the process. A chromia/alumina catalyst with chromia comprising from 5 to 50 weight percent of the composition is preferred. Other useful metal oxide combinations are $V_2O_5$ supported by $Al_2O_3$, $CeO_2$ supported by $Al_2O_3$, $U_3O_8$ supported by $Al_2O_3$ and $Cr_2O_3$ and $V_2O_5$ supported by $Al_2O_3$. As is the case with most gas phase catalyzed reactions, a catalyst having a high surface area is desirable. Those metal oxide catalysts having a BET surface area of from 25 to 100 m.$^2$/gm. are preferred.

Within the operative temperature range of 200° to 1200° C., a range of from 400° to 1000° C. is preferred. The residence time, i.e. period during which the reactants remain in the heated reaction zone, should be within the range of from about 0.1 to 30 seconds for substantial reaction without excessive accumulation of organic tars in the reaction zone. The preferred residence time is from 0.2 to 10 seconds. In general, the optimum residence time will vary inversely with reaction temperature.

The mole ratio of $O_2$/organic bromide is usually within the range of from 2/1 to 10/1 with a ratio of from 2.5/1 to 4/1 being preferred.

Organic bromides useful as bromine sources are those aliphatic bromides containing up to six carbon atoms. Aromatic bromides, having bromine attached to either the ring, or side chain in the case of alkaryl bromides, and containing up to 9 carbon atoms may also be used. Selection of organic bromides containing more than the above described number of carbon atoms, while providing an operable process, results in rapid accumulation of tars in the reaction zone. Organic bromides having only one or two carbon atoms, e.g. ethylene dibromide and methylene bromide are especially useful bromine sources.

The invention is further illustrated by the following examples:

EXAMPLES 1–2

Oxygen and EDB were fed through a ¾-inch by 30-inch Vycor reactor packed with a 24-inch bed of catalyst. The reactor was heated to the desired temperature to initiate the reaction. After initiation, most of the reaction appeared to be taking place in the first one inch of the catalyst bed. This one inch area of catalyst, which had an estimated temperature of 600° to 800° C., glowed red hot during the reaction indicating that the reaction was highly exothermic and self-sustaining. The catalyst was made up of 5/32 inch diameter pellets of a chromia/alumina cracking catalyst containing 19 weight percent $Cr_2O_3$ supported by $Al_2O_3$. The catalyst had a density of 60 lb./ft.³ and a BET surface area of 60 m.²/gm. The conditions and results for two runs carried out in this manner are as follows:

|  | Example 1 | Example 2 |
|---|---|---|
| EDB fed (moles) | 1.02 | 1.23 |
| O₂ fed (moles) | 7.54 | 5.58 |
| O₂/EDB mole ratio | 7.4/1.0 | ¹ 4.5/1.0 |
| Time for run (hrs.) | 5.25 | 3.5 |
| Furnace temperature, ° C | 500 | 450 |
| Contact time (total bed), sec | 6.06 | 5.5 |
| Contact time (1-in. reaction zone), sec | 0.25 | 0.23 |
| Percent converted to Br₂ | 91.0 | 83.5 |
| Percent converted to HBr | 1.6 | 2.7 |
| Bromine recovery, percent | 92.6 | 86.2 |

¹ 2.6/1.0 during last hour.

The low bromine recoveries were due to the holdup of bromine vapors in the equipment.

EXAMPLES 3–4

Two additional runs were carried out as in Example I except that air was used instead of oxygen. Table II sets out the reaction conditions and results for two runs carried out in this manner.

TABLE II.—OXIDATION OF ETHYLENE DIBROMIDE WITH AIR

| Ex. | Moles EDB | Furnace temp., ° C. | Air/EDB mole ratio | O₂/EDB mole ratio | Residence time (sec.) | Moles HBr | Moles Br₂ | Recovered organics, gm. | Percent converted to— HBr | Percent converted to— Br₂ |
|---|---|---|---|---|---|---|---|---|---|---|
| 3 | 0.656 | 500 | 6.05/1.0 | 1.21/1.0 | 10.4 | 1.19 | Trace | 6 | 91 | Trace |
| 4 | 0.51 | 500 | 20.6/1.0 | 4.12/1.0 | 5.1 | .01 | 0.502 | 3 | ~1 | ~98 |

EXAMPLES 5–16

Several additional runs were made as in Example 2, i.e. furnace temperature 450° C. The results of these runs are set out in Table III.

TABLE III

| Ex. | Moles O₂ fed | Moles EDB fed | O₂/EDB mole ratio | Contact time total bed, section | Contact time 1-in. zone | Percent converted to— Br₂ | Percent converted to— HBr | Bromine recovery*, percent |
|---|---|---|---|---|---|---|---|---|
| 5 | 5.95 | 1.58 | 3.1/1.0 | 10 | 0.42 | 51.5 | 48.5 | 83 |
| 6 | 3.2 | 0.93 | 3.4/1.0 | 10.2 | 0.43 | 93.5 | 6.5 | 84 |
| 7 | 3.9 | 1.4 | 2.78/1.0 | 9.97 | 0.42 | 58.0 | 42.0 | 93 |
| 8 | 3.4 | 0.77 | 4.4/1.0 | 10.1 | 0.42 | 9i.4 | 1.6 | 89 |
| 9 | 2.9 | 1.15 | 2.52/1.0 | 10.4 | 0.44 | 42.0 | 58.0 | 95 |
| 10 | 3.9 | 1.14 | 3.4/1.0 | 10.5 | 0.44 | 91.3 | 8.7 | 95 |
| 11 | 3.12 | 1.02 | 3.06/1.0 | 10.2 | 0.43 | 63.0 | 37.0 | 90 |
| 12 | 3.12 | 1.02 | 3.06/1.0 | 10.2 | 0.43 | 58.0 | 42.0 | 90 |
| 13 | 3.12 | 0.894 | 3.49/1.0 | 10.5 | 0.44 | 95.4 | 4.6 | 87 |
| 14 | 2.89 | 1.15 | 2.51/1.0 | 10.5 | 0.44 | 36.0 | 64.0 | 89 |
| 15 | 3.9 | 1.26 | 3.1/1.0 | 10.2 | 0.43 | 76.0 | 24.0 | 89 |
| 16 | 5.46 | 1.68 | 3.25/1.0 | 10.3 | 0.43 | 81.5 | 18.5 | 98 |

*By bromine recovery it is meant bromine recovered in any form.

The data of Examples 1–16 demonstrate that greater than 95% of the recovered bromine values in EDB can be obtained as $Br_2$ by the present process. Higher $Br_2$ recoveries are obtained at higher $O_2$/EDB ratios.

We claim:

1. A process for the recovery of $Br_2$ and HBr from organic bromides which comprises reacting an organic bromide with oxygen at a temperature within the range of from 200° to 1200° C. in the presence of a catalyst, said catalyst being selected from one or more of the group of $Cr_2O_3$, $Al_2O_3$, $V_2O_3$, $V_2O_5$, $Mo_3O_8$, $Mo_2O_5$, $MoO_2$, $WO_2$, $W_2O_5$, $CeO_2$ or $U_3O_8$ wherein the ratio of $O_2$/organic bromide is within the range of from 2/1 to 10/1.

2. The process of claim 1 wherein the catalyst is $V_2O_5$ supported by $Al_2O_3$, $CeO_2$ supported by $Al_2O_3$, $U_3O_8$ supported by $Al_2O_3$ or $Cr_2O_3$ and $V_2O_5$ supported by $Al_2O_3$.

3. The process of claim 1 wherein the catalyst is $Cr_2O_3$ supported by $Al_2O_3$.

4. The process of claim 1 wherein the temperature is within the range of from 400° to 1000° C.

5. The process of claim 1 wherein the residence time is from 0.1 to 30 seconds.

6. The process of claim 1 wherein the contact time is from 0.2 to 10 seconds.

7. The process of claim 1 wherein the organic bromide is an aliphatic bromide containing up to six carbon atoms or an aromatic bromide containing up to 9 carbon atoms.

8. The process of claim 3 wherein the temperature is within the range of from 400° to 1000° C., the contact time is from 0.2 to 10 seconds, the mole ratio of $O_2$/organic bromide is from 2.5/1 to 4/1 and the organic bromide is ethylene dibromide.

References Cited

UNITED STATES PATENTS

| 3,273,964 | 9/1966 | De Rosset | 23—216 |
| 3,310,380 | 3/1967 | Lester | 23—216 |
| 3,346,340 | 10/1967 | Louvar et al. | 23—216 |

OSCAR R. VERTIZ, Primary Examiner

G. ALVARO, Assistant Examiner

U.S. Cl. X.R.

423—481